US012583531B2

(12) United States Patent
Muramatsu et al.

(10) Patent No.: US 12,583,531 B2
(45) Date of Patent: Mar. 24, 2026

(54) TUNNEL REINFORCING STRUCTURE

(71) Applicant: HONDA MOTOR CO., LTD., Tokyo (JP)

(72) Inventors: Yuki Muramatsu, Tokyo (JP); Kota Fujisawa, Tokyo (JP); Shuma Yoshioka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 436 days.

(21) Appl. No.: 18/192,139

(22) Filed: Mar. 29, 2023

(65) Prior Publication Data

US 2023/0312017 A1 Oct. 5, 2023

(30) Foreign Application Priority Data

Mar. 31, 2022 (JP) ................................. 2022-058269

(51) Int. Cl.
B62D 25/20 (2006.01)
B62D 25/02 (2006.01)

(52) U.S. Cl.
CPC ....... B62D 25/2009 (2013.01); B62D 25/025 (2013.01)

(58) Field of Classification Search
CPC .............. B62D 25/025; B62D 25/2036; B62D 25/2009; B62D 25/20; B62D 21/157
USPC ........ 296/209, 23.01, 3, 204, 193.07, 29, 30
See application file for complete search history.

(56) References Cited

U.S. PATENT DOCUMENTS

| | | | | |
|---|---|---|---|---|
| 6,926,352 | B2 * | 8/2005 | Gotou | B62D 25/2036 |
| | | | | 296/193.08 |
| 9,764,775 | B2 * | 9/2017 | Daigaku | B62D 25/2036 |
| 11,046,369 | B2 * | 6/2021 | Natsume | B62D 25/2036 |
| 2016/0159402 | A1 | 6/2016 | Nakaya et al. | |
| 2017/0057549 | A1 | 3/2017 | Saeki | |
| 2017/0106906 | A1 | 4/2017 | Onishi | |
| 2019/0092396 | A1 | 3/2019 | Abe et al. | |

FOREIGN PATENT DOCUMENTS

| | | |
|---|---|---|
| CN | 103043113 A | 4/2013 |
| CN | 107010124 A | 8/2017 |
| CN | 214057295 U | 8/2021 |
| JP | 2003-011853 A | 1/2003 |

(Continued)

OTHER PUBLICATIONS

Chinese Office Action received in corresponding Chinese application No. 202310191287.X dated Sep. 30, 2025 with English translation (17 pages).

(Continued)

*Primary Examiner* — Dennis H Pedder
(74) *Attorney, Agent, or Firm* — Rankin, Hill & Clark LLP

(57) ABSTRACT
A tunnel reinforcing structure includes a floor cross member that extends in a vehicle width direction and that couples a side sill on each side of the vehicle and a floor tunnel to each other, the floor tunnel being a tunnel in which an exhaust pipe is arranged in a tunnel interior opened toward the lower external side of a vehicle, seat brackets that are arranged in front of and behind the cross member in a vehicle front-rear direction and that are joined to the floor tunnel, and a first tunnel reinforcing member that is provided in a tunnel interior parallel to the cross member in the vehicle width direction.

6 Claims, 7 Drawing Sheets

(56) References Cited

FOREIGN PATENT DOCUMENTS

| | | | |
|----|-------------|----|---------|
| JP | 2008-137589 | A  | 6/2008  |
| JP | 2014-227029 | A  | 12/2014 |
| JP | 2016-107782 | A  | 6/2016  |
| JP | 2017-43155  | A  | 3/2017  |
| JP | 2017-087814 | A  | 5/2017  |
| JP | 2021-041816 | A  | 3/2021  |
| WO | 2017/163307 | A1 | 9/2017  |

OTHER PUBLICATIONS

Japanese Office Action received in corresponding Japanese application No. 2022-058269 dated Sep. 9, 2025 with English translation (10 pages).

* cited by examiner

FIG. 2

UPPER
LEFT ↔ RIGHT
LOWER

UPPER
LEFT ← → RIGHT
LOWER

UPPER
LEFT
REAR
FRONT
RIGHT
LOWER

TUNNEL REINFORCING STRUCTURE

BACKGROUND OF THE INVENTION

1. Field of the Invention

The present invention relates to a tunnel reinforcing structure configured to reinforce a floor tunnel such that the floor tunnel does not vibrate due to load inputted into a vehicle.

2. Description of the Related Art

As a structure of a floor tunnel, for example, there has been conventionally a structure described in Patent Literature 1. In this structure, the stiffness of side sills joined to both vehicle sides of a floor panel is set higher than the stiffness of a floor tunnel joined to the floor panel, and stiffness adjustment holes are provided in front and rear walls of seat brackets on the side sill sides to reduce vehicle body mass while maintaining dynamic performance in traveling.

PRIOR ART DOCUMENT(S)

Patent Literature(s)

Patent Literature 1: JP2017-087814A

SUMMARY OF THE INVENTION

However, the structure described in Patent Literature 1 has the following problem. When the stiffness of the floor tunnel is low, the floor tunnel deforms due to crashing of a vehicle or the like, and vibration inputted into the floor tunnel in traveling via an exhaust pipe or a shaft arranged in the tunnel interior causes the floor tunnel to vibrate and causes abnormal noise in a vehicle interior.

The present invention has been made in view of the aforementioned circumstances, and an object is to provide a tunnel reinforcing structure that can suppress vibration of a floor tunnel such that no abnormal noise occurs in a vehicle interior when load is inputted into the vehicle, by reinforcing the floor tunnel and improving the stiffness of the floor tunnel.

A tunnel reinforcing structure according to the present invention to achieve aforementioned object is a tunnel reinforcing structure including: a floor tunnel that extends in a front-rear direction and that is opened toward the lower external side of a vehicle; an exhaust pipe or a shaft that is arranged in an interior of the floor tunnel; a side sill that extends in the front-rear direction on the vehicle width direction outer side of the vehicle; a floor panel that is provided between the floor tunnel and the side sill; a floor cross member that extends on the floor panel in a vehicle width direction and that couples the floor tunnel and the side sill to each other; seat brackets that are arranged in front of and behind the floor cross member and that are joined to the floor tunnel; a first tunnel reinforcing member that is provided in the interior of the floor tunnel parallel to the floor cross member in the vehicle width direction; a floor frame that extends in the front-rear direction on the lower external side of the floor panel; and a coupling bracket that is arranged across the interior of the floor tunnel in the vehicle width direction and to which the exhaust pipe or the shaft is coupled, in which the seat brackets are attached to the floor frame via the floor panel, and are attached to the coupling bracket via the floor tunnel.

In the present invention, it is possible to obtain a tunnel reinforcing structure that suppresses vibration of a floor tunnel such that no abnormal noise occurs in a vehicle when load is inputted into the vehicle, by reinforcing the floor tunnel and improving the stiffness of the floor tunnel.

BRIEF DESCRIPTION OF THE DRAWINGS

FIG. 2 is a perspective view showing the tunnel reinforcing structure on the floor panel.

DETAILED DESCRIPTION OF THE EMBODIMENTS

Configuration of Embodiment

An embodiment of the present invention is described in detail with reference to FIGS. 1 to 7. In the description, the same elements are denoted by the same reference signs, and overlapping description is omitted. Moreover, in each drawing, "front and rear" shown by the arrows indicate a front-rear direction of an automobile (not shown), "left and right" indicate a width direction of the automobile, and "upper and lower" indicate a vertical upper-lower directions.

Figure 1:
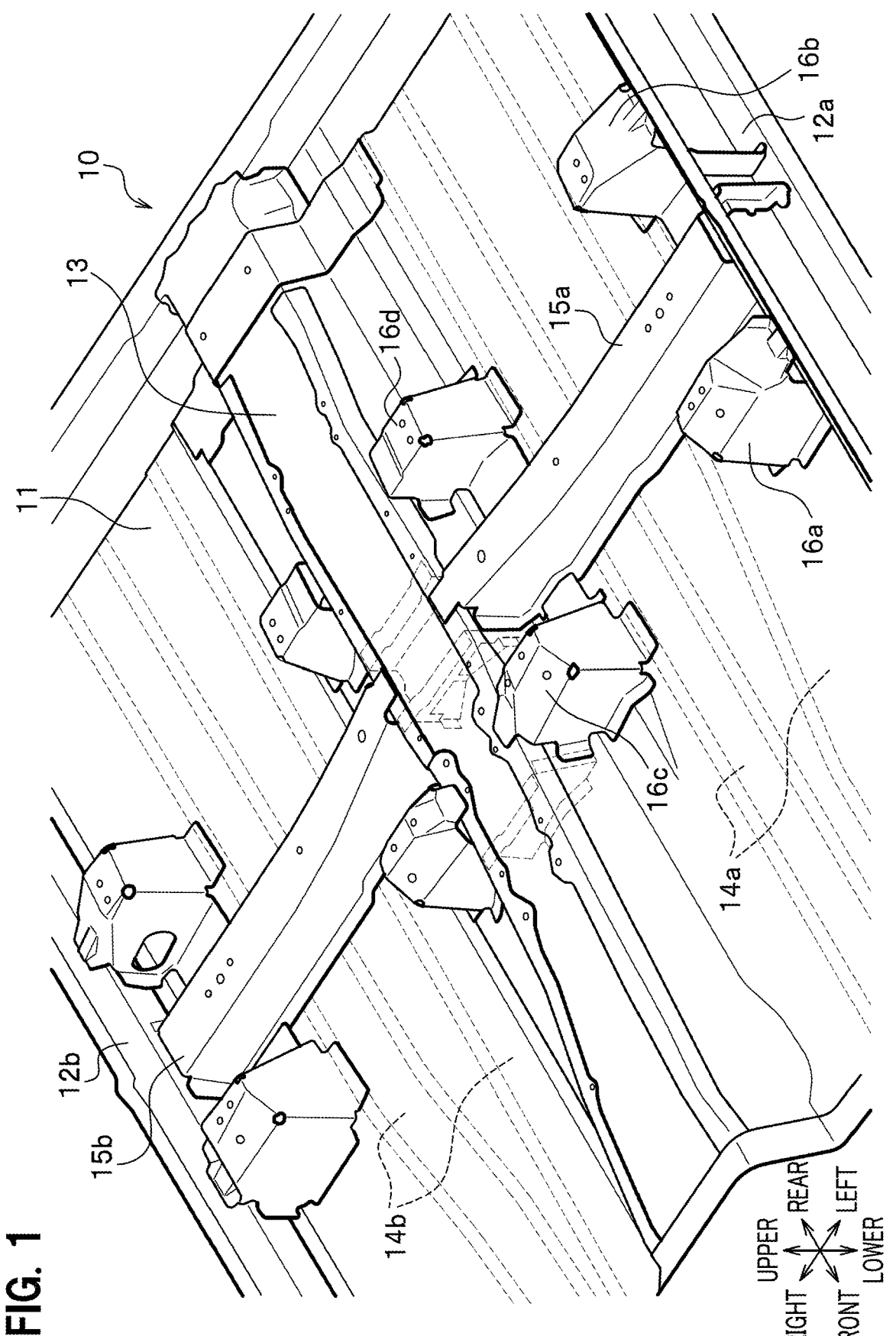
FIG. 1 is a perspective view showing a tunnel reinforcing structure on a floor panel in a vehicle interior of the present embodiment.

FIG. 1 is a perspective view showing a tunnel reinforcing structure on a floor panel in a vehicle interior.

The tunnel reinforcing structure 10 shown in FIG. 1 is configured to include the floor panel 11 provided in the vehicle interior, side sills 12a and 12b, a floor tunnel 13, floor frames 14a and 14b (see FIG. 3), floor cross members (also referred to as cross members) 15a and 15b, multiple seat brackets 16a, 16b, 16c, and 16d. Note that, since the seat brackets 16a to 16d are arranged at left-right symmetric positions with respect to the floor tunnel 13, only the seat brackets on the vehicle width direction left side are denoted by the reference signs. The seat brackets 16a to 16d and the cross member 15a on the vehicle width direction left side are described as a representative.

The side sills 12a and 12b extend in the vehicle front-rear direction (also referred to as front-rear direction), and are joined to vehicle width direction outer edge portions of the floor panel 11.

Figure 2:
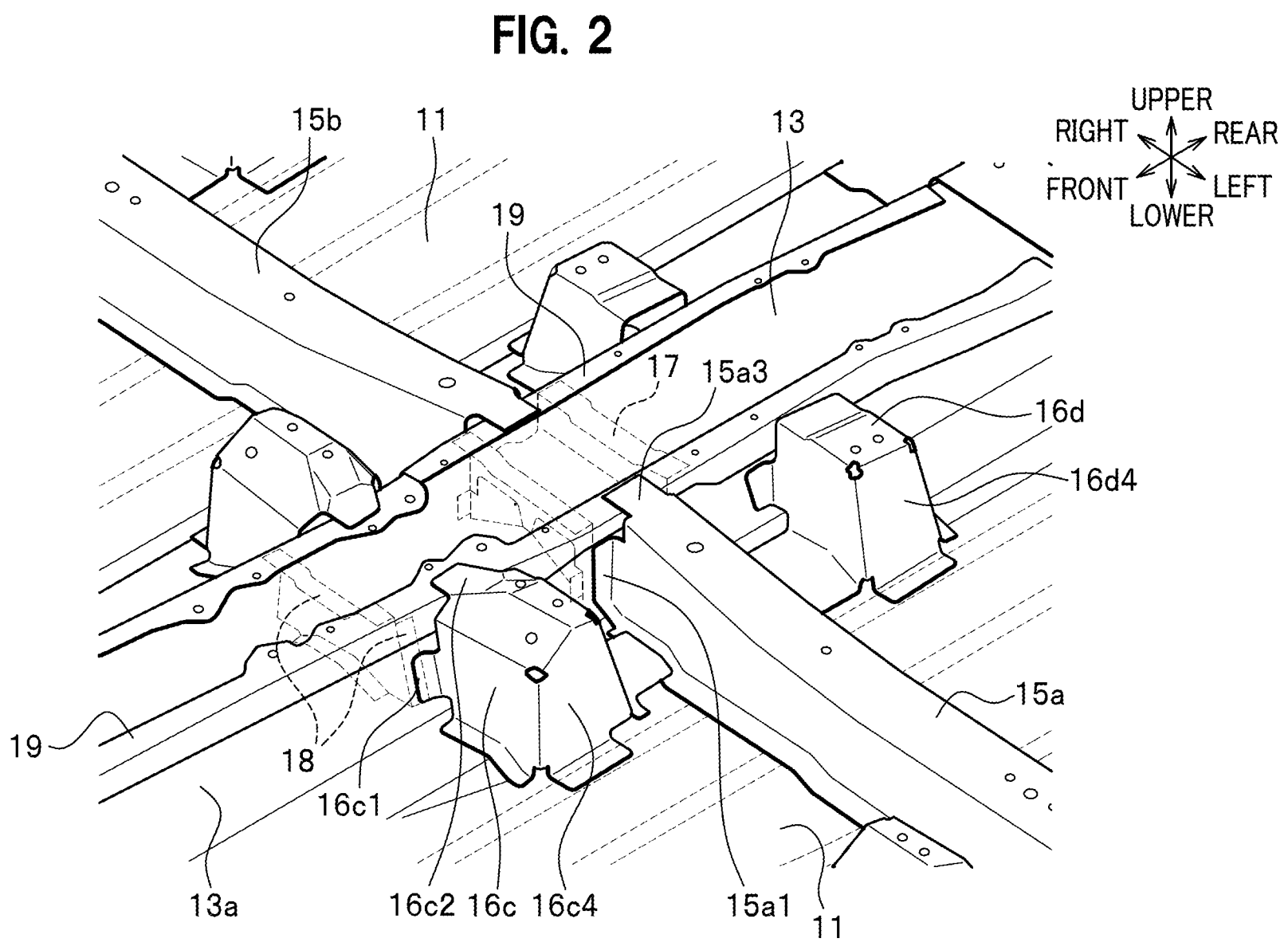

The floor tunnel 13 extends in the front-rear direction at the midpoint of the side sills 12a and 12b on both sides of the vehicle. Moreover, the floor tunnel 13 is joined to vehicle width direction inner edge portions of the floor panel 11 with a tunnel opened toward the lower external side (external side) of the vehicle. An interior of an opening of the tunnel on the external side is referred to as tunnel interior. As shown in FIG. 2, the floor tunnel 13 includes a first tunnel reinforcing member 17 that extends on the upper surface side of the tunnel interior, in the vehicle width direction parallel to the cross member 15a extending in the vehicle width direction. The floor tunnel 13 also includes a coupling bracket 18 that extends in the vehicle width direction in the tunnel interior. The coupling bracket 18 holds an exhaust pipe (see FIG. 7) or a shaft extending in the front-rear direction in the tunnel interior by connecting it to a side wall of the tunnel interior.

The floor cross members 15a and 15b shown in FIG. 1 extend in the vehicle width direction and couple the side sills 12a and 12b and the floor tunnel 13 to one another. As shown in FIG. 2, the left cross member 15a forms a hollow cross section (closed cross section) with the floor panel 11 being a bottom surface. Vertical flanges 15a1 and 15a1 provided by bending a closed cross section end portion of the cross member 15a to left and right (corresponding to the vehicle front and rear) are joined to a side surface of the floor tunnel 13 on the vehicle interior side by welding or the like. Furthermore, a flange 15a3 extending from an upper surface of the closed cross section end portion of the cross member 15a toward the vehicle width direction inner side is joined to an upper surface of the floor tunnel 13. Vertical flanges of a closed cross section end portion on the other end side of the cross member 15a are also joined to a side surface of the side sill 12a facing the vehicle width direction inner side.

The floor frames 14a and 14b are each provided as follows between a set of the seat brackets 16a and 16b on the side sill 12a side and a set of the seat brackets 16c and 16d on the floor tunnel 13 side on each side of the floor tunnel 13. Specifically, two floor frames 14a or 14b are provided parallel to extend in the vehicle front-rear direction, on the lower external side of the floor panel 11 between the set of the seat brackets 16a and 16b and the set of the seat brackets 16c and 16d on each side of the floor tunnel 13. Description is given by using the floor frames 14a on one side as a representative. In other words, the floor frames 14a are arranged below the floor panel 11 between the set of the seat brackets 16a and 16b and the set of seat brackets 16c and 16d arranged to be spaced away from each other in the vehicle width direction.

The seat brackets 16a to 16d are brackets where a seat (not shown) on which a passenger seats is mounted and supported, and are arranged in front and behind the cross members 15a and 15b in the vehicle front-rear direction.

As shown in FIG. 2, the seat brackets 16c and 16d on the floor tunnel 13 side include main body portions 16c4 and 16d4 that each form a hollow cross section with the floor panel 11 being a bottom surface and that are spaced away from each other in the front-rear direction of the cross member 15a. Description is given by using the seat bracket 16c as a representative. In the seat bracket 16c, vertical flanges 16c1 bent from a closed cross section end portion of the main body portion 16c4 to left and right (vehicle front and rear) are joined to a side wall 13a of the floor tunnel 13 on the vehicle width direction outer side. Furthermore, a flange 16c2 extending in the vehicle width direction from an upper portion of the closed cross section end portion of the main body portion 16c4 is joined to an upper surface of the floor tunnel 13 via a second tunnel reinforcing member 19.

The seat bracket 16c is joined via the side wall 13a of the tunnel interior to the coupling bracket 18 that is attached to the tunnel interior of the floor tunnel 13 and to which the exhaust pipe (FIG. 7) or the shaft is coupled. Furthermore, as shown in FIG. 3, the seat bracket 16c is connected to the floor frame 14a via the floor panel 11, the floor frame 14a extending in the front-rear direction on the lower external side of the floor panel 11.

The seat bracket 16c includes joining flanges 16c5 that extend in three directions from a lower end of the main body portion 16c4 along an upper surface of the floor panel 11. Specifically, the seat bracket 16c includes the joining flanges 16c5 and 16c5 that extend in the front-rear directions from the main body portion 16c4 and the joining flange 16c5 that extends toward the vehicle width direction outer side. Moreover, the joining flange 16c5 that extend rearward from the main body portion 16c4 extends toward the cross member 15a as a coupling portion 16c3.

The coupling portion 16c3 is coupled to a flange 15a2 that is bent from a lower end of the cross member 15a along the upper surface of the floor panel 11 and that extends in the vehicle width direction. Specifically, three points of the floor panel 11, the coupling portion 16c3 of the seat bracket 16c, and the flange 15a2 of the cross member 15a are welded (joined) to one another. Note that the coupling portion 16c3 includes multiple beads that extend in the vehicle front-rear direction and that are provided at predetermined intervals in the vehicle width direction. These beads improve the stiffness of the coupling portion 16c3.

Figure 3:
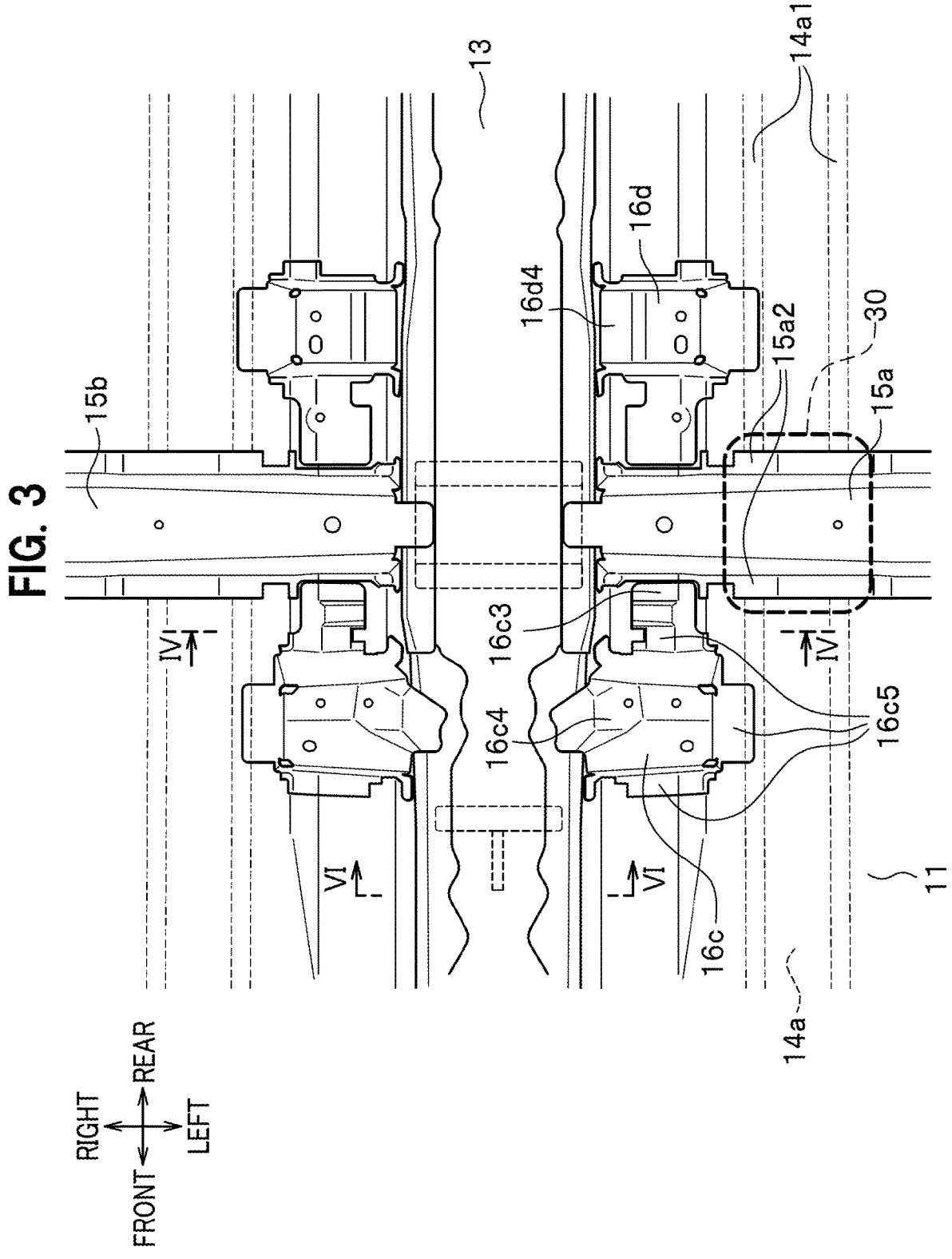
FIG. 3 is a plan view showing an intersecting structure of a cross member and a floor frame.

As shown in a portion surrounded by a broken line frame 30 in FIG. 3, the floor frame 14a extends to intersect the cross member 15a, and are welded (joined) to the cross member 15a via the floor panel 11 in this intersecting portion. In detail, flanges 14a1 on both sides of the floor frame 14a in the vehicle width direction and the flanges 15a2 on both sides of the cross member 15a in the vehicle front-rear direction are joined to one another with the floor panel 11 arranged therebetween. Welding the floor frame 14a and the cross member 15a as described above allows load inputted into the floor frame 14a to be efficiently transmitted to the cross member 15a.

As shown in FIG. 2, the second tunnel reinforcing members 19 extending along the tunnel longitudinal direction (vehicle front-rear direction) of the tunnel interior are joined to corner portions of on both sides of an upper outer surface of the floor tunnel 13 extending in the tunnel longitudinal direction. The coupling bracket 18 is joined to the tunnel interior of the floor tunnel 13 on the inner sides of the second tunnel reinforcing members 19. Joining the second tunnel reinforcing members 19 along the corner portions on both sides of the upper outer surface extending in the tunnel longitudinal direction of the tunnel interior as described above can improve the stiffness of the floor tunnel 13. Joining the coupling bracket 18 to the tunnel interior of the floor tunnel 13 that has improved stiffness and that is provided on the inner sides of the second tunnel reinforcing members 19 can improve joining strength of the coupling bracket 18.

Figure 4:
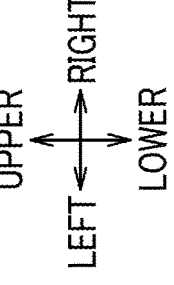
FIG. 4 is a cross-sectional view along the line IV-IV in FIG. 3.

Description is given with reference to a cross-sectional configuration of the first tunnel reinforcing member 17 in the vehicle width direction shown in FIG. 4 that is a cross-sectional view along the line IV-IV in FIG. 3. As shown in FIG. 4, the first tunnel reinforcing member 17 is arranged in the tunnel interior of the floor tunnel 13 arranged between the left cross member 15a and the right cross member 15b in the vehicle width direction.

The first tunnel reinforcing member 17 includes an upper member 17a and a lower member 17b arranged in the tunnel interior. The upper member 17a is arranged above an intermediate position in a tunnel height direction, and forms a closed cross section closing a cavity of the tunnel interior in the vehicle width direction, above the intermediate position.

The lower member 17b includes paired truss portions 17t1 and 17t2 with truss shapes (described later) formed on both of left and right sides symmetrically with respect to an imaginary vertical line extending in the upper-lower direction at the vehicle width direction center of the aforementioned closed cross section, below the upper member 17a. The paired truss portions 17t1 and 17t2 are formed to be coupled at a coupling portion 17c extending in a lateral direction (horizontal direction). The coupling portion 17c is formed along a lower surface of the upper member 17a.

The truss shaped are each formed by being surrounded by a first vertical edge 17b1 that extends in the vertical direction and that is in contact with the side wall 13a of the tunnel interior, an upper lateral edge 17b2 that extends in the lateral direction above the first vertical edge 17b1, a tilted edge 17b3 that extends in an upward tilted shape from a lower end of the first vertical edge 17b1 toward a right end of the coupling portion 17c, and a second vertical edge 17b4 connecting an upper end of the tilted edge 17b3 and a right end of the upper lateral edge 17b2 in the vertical direction. The second vertical edge 17b4 has a shorter dimension than the first vertical edge 17b1.

Dividing the first tunnel reinforcing member 17 into the upper member 17a and the lower member 17b as described above allows load inputted into an upper portion of the floor tunnel 13 and load inputted into a lower portion of the floor tunnel 13 to be supported separately by the upper member 17a and the lower member 17b, respectively.

Moreover, for example, load inputted from the right cross member 15b into a lower portion of the side wall of the floor tunnel 13 is transmitted to the coupling portion 17c via the upward tilted edge 17b3 of one truss portion 17t2 as shown by the arrow Y1. This transmitted load is further transmitted to the other truss portion 17t1 via the coupling portion 17c as shown by the arrow Y2, and is transmitted to the left cross member 15a via the downward tilted edge 17b3. In this case, since the load transmitted from the coupling portion 17c is supported by the downward tilted edge 17b3 of the truss portion 17t1, the lower member 17b can support the floor tunnel 13 such that the floor tunnel 13 does not collapse.

Figure 5:
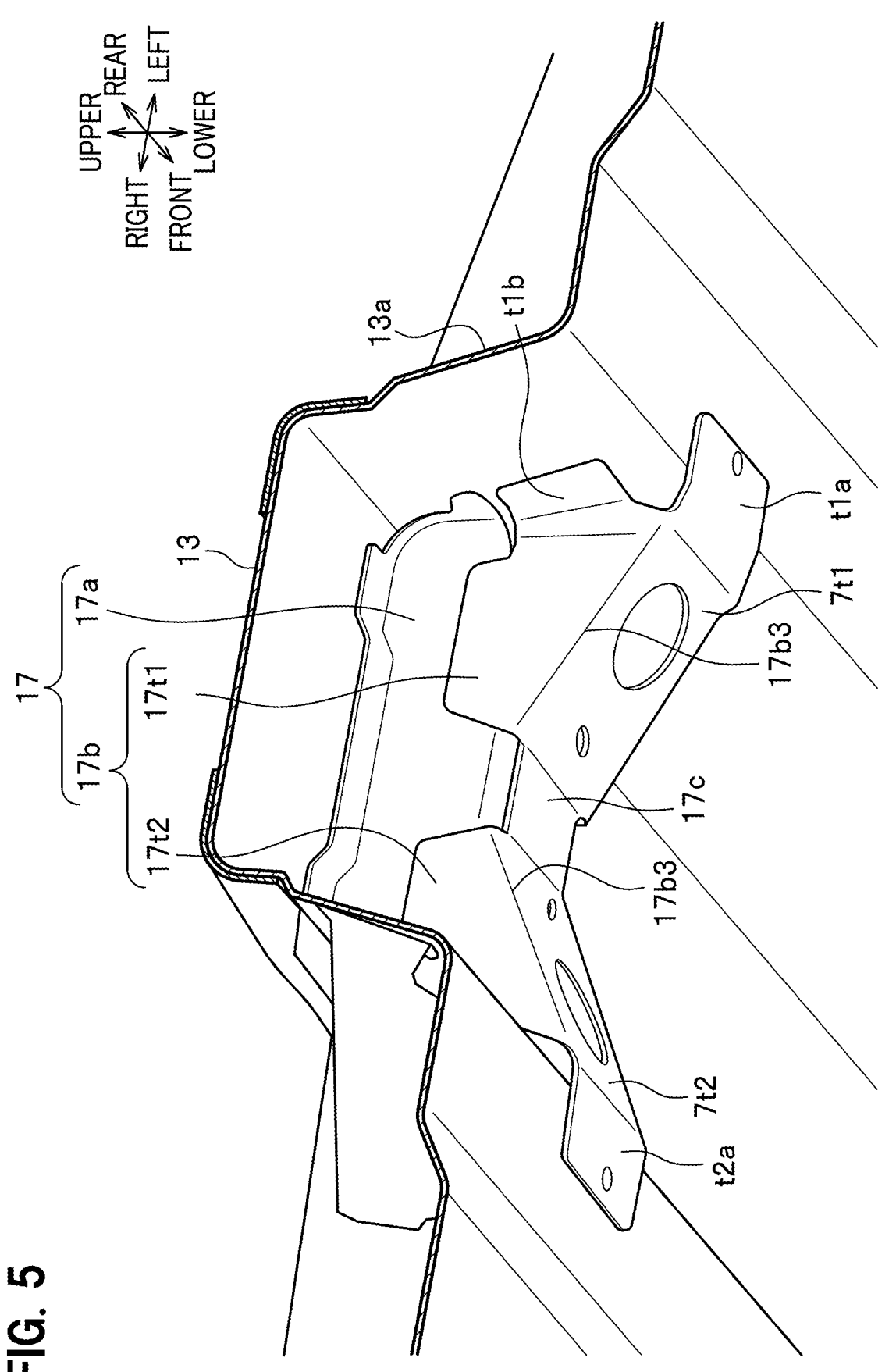
FIG. 5 is a perspective view showing an upper member and truss portions of a lower member in a first tunnel reinforcing member in a floor tunnel.

As shown in FIG. 5, the truss portions 17t1 and 17t2 include titled surface portions 7t1 and 7t2 extending from the tilted edges 17b3 of the respective truss portions 17t1 and 17t2 toward the vehicle front side by predetermined length. The titled surface portions 7t1 and 7t2 include first joining portions t1a and t2a that extend toward the left and right sides in the vehicle width direction and that are joined to the lower surface of the floor panel 11 (see FIG. 2). The titled surface portions 7t1 and 7t2 are connected to each other by the coupling portion 17c. The truss portions 17t1 and 17t2 also include the second joining portions t1b. Description is given by using the truss portion 17t1 as a representative. The truss portion 17t1 includes the second joining portion t1b in which the truss portion 17t1 facing the vehicle rear side is bent in the vehicle width direction and joined to the inner side of the side wall 13a of the floor tunnel 13.

Description is given by using one of the truss portions 17t1 and 17t2 as a representative. According to this structure, the first joining portion t1a of the truss portion 17t1 is joined to the lower surface of the floor panel 11, and the second joining portion t1b is joined to the side wall 13a of the floor tunnel 13. Accordingly, the stiffness of the floor tunnel 13 is improved. Moreover, it is possible to transmit load inputted into the floor tunnel 13 to the lower surface of the floor panel 11 via the first joining portion t1a and to the side wall 13a of the floor tunnel 13 via the second joining portion t1b. Specifically, it is possible to release and distribute the load inputted into the floor tunnel 13 to both of the floor panel 11 and the floor tunnel 13.

Figure 6:
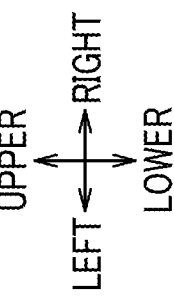
FIG. 6 is a cross-sectional view of the floor tunnel along the line VI-VI shown in FIG. 3.
Figure 7:
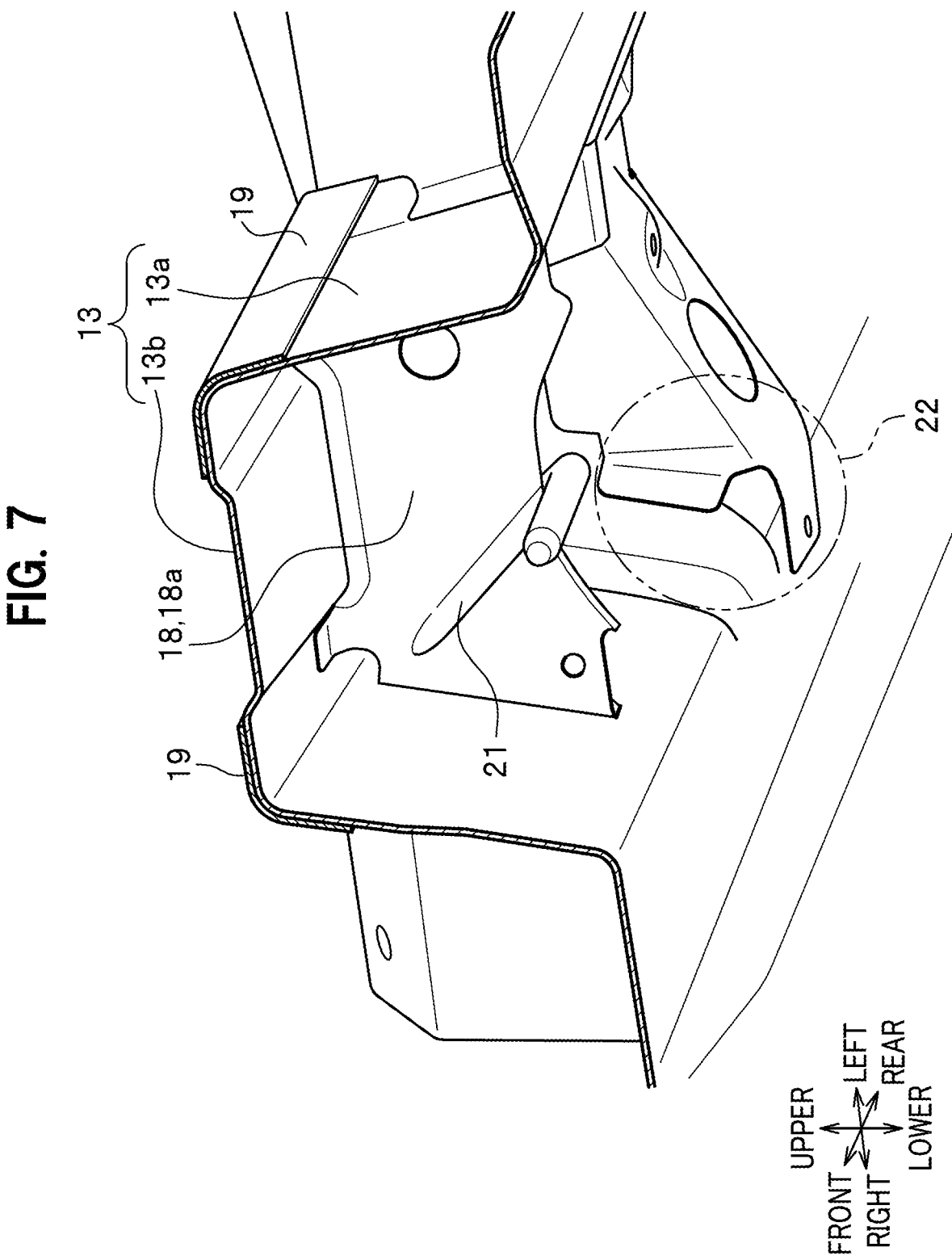
FIG. 7 is a perspective view showing a configuration of a coupling bracket in which the cross section of the floor tunnel shown in FIG. 6 is viewed from the front side toward the oblique rear side.

FIG. 6 is a cross-sectional view of the floor tunnel 13 along the line VI-VI shown in FIG. 3. FIG. 7 shows a configuration of the coupling bracket 18 in which the cross section of the floor tunnel 13 shown in FIG. 6 is viewed from the front side toward the oblique rear side. The coupling bracket 18 is attached to the tunnel interior of the floor tunnel 13 on the inner sides of the second tunnel reinforcing members 19.

As shown in FIG. 6, the coupling bracket 18 arranged in the tunnel interior includes a partition portion 18a that is connected to the side walls 13a and a top portion 13b of the tunnel interior of the floor tunnel 13 and that closes the tunnel interior in the vehicle width direction and partitions the tunnel interior. As shown in FIG. 7, a rod 21 protruding from the partition portion 18a toward the vehicle rear side and bent in an L shape is a rod for hooking and suspending the exhaust pipe 22 or the shaft. Providing the coupling bracket 18 with the partition portion 18a coupled to the side walls 13a and the top portion 13b of the tunnel interior improves the stiffness of the floor tunnel 13.

Effects of Embodiment

Next, characteristic configurations and effects of the aforementioned tunnel reinforcing structure of the present embodiment are described.

(1) The tunnel reinforcing structure 10 includes the floor tunnel 13 that extends in the front-rear direction and that is opened toward the lower external side of the vehicle, the exhaust pipe or the shaft that is arranged in the interior of the floor tunnel 13, the side sill 12a that extends in the front-rear direction on the vehicle width direction outer side of the vehicle, the floor panel 11 that is provided between the floor tunnel 13 and the side sill 12a, the cross member 15a that extends on the floor panel 11 in the vehicle width direction and that couples the floor tunnel 13 and the side sill 12a to each other, and the seat brackets (for example, the seat bracket 16c) that are arranged in front of and behind the cross member 15a and that are joined to the floor tunnel 13.

The tunnel reinforcing structure 10 further includes the first tunnel reinforcing member 17 that is provided in the interior of the floor tunnel 13 parallel to the cross member 15a in the vehicle width direction, the floor frames 14a that extend in the front-rear direction on the lower external side of the floor panel 11, and the coupling bracket 18 that is arranged across the interior of the floor tunnel 13 in the vehicle width direction and to which the exhaust pipe or the shaft is coupled, and the seat bracket 16c is attached to the floor frame 14a via the floor panel 11, and is attached to the coupling bracket 18 via the floor tunnel 13.

According to this configuration, the coupling bracket 18 to which the exhaust pipe is coupled is connected to the seat bracket 16c connected to the floor frame 14a, via the side wall 13a of the floor tunnel 13, and this allows load inputted from the coupling bracket 18 to the floor tunnel 13 to be transmitted to the seat bracket 16c with high stiffness. This transmission can suppress vibration of the side wall 13a inputted from the exhaust pipe to the floor tunnel 13. Thus, vibration and abnormal noise inputted into the vehicle interior can be reduced.

(2) The seat bracket 16*c* includes the main body portion 16*c*4 that forms the hollow cross section with the floor panel 11 being the bottom surface and the coupling portion 16*c*3 that is coupled to the cross member 15*a*. The coupling portion 16*c*3 is formed to extend such that the joining flange 16*c*5 extending from the lower end of the main body portion 16*c*4 along the floor panel 11 is connected to the cross member 15*a*.

According to this configuration, the joining flange 16*c*5 of the seat bracket 16*c* is connected (joined) to the cross member 15*a* as the coupling portion 16*c*3. Accordingly, it is possible to efficiently transmit load inputted into the seat bracket 16*c* to the cross member 15*a*, and improve the stiffness between the seat bracket 16*c* and the cross member 15*a*. Thus, vibration of the coupling bracket 18 can be further suppressed.

Since the coupling portion 16*c*3 has the flat surface shape, when three-dimensional load from various directions such as side impact of the vehicle body or twisting of the vehicle body is inputted, the twisting can be eased and suppressed in the coupling portion 16*c*3. This suppression can suppress breakage or detachment of the coupling between the seat bracket 16*c* and the cross member 15*a*. Note that, if the seat bracket 16*c* is connected to the cross member 15*a* in a closed cross section, the seat bracket 16*c* may be three-dimensionally twisted and detached, and the load transmission thus becomes impossible.

(3) The floor frame 14*a* extends to intersect the cross member 15*a*, and is welded to the cross member 15*a* via the floor panel 11 in the intersecting portion.

According to this configuration, welding in the intersecting portion of the floor frame 14*a* and the cross member 15*a* allows load inputted into the seat bracket 16*c* to be efficiently transmitted to the cross member 15*a* via the floor frame 14*a*. Accordingly, load transmitted to the floor tunnel 13 to which the seat bracket 16*c* is joined can be suppressed. Thus, vibration of the coupling bracket to which the exhaust pipe arranged in the tunnel interior is coupled can be further suppressed. Moreover, the stiffness between the seat bracket 16*c* and the cross member 15*a* can be improved.

(4) The tunnel reinforcing structure 10 includes the second tunnel reinforcing members 19 that are attached to the corner portions of the upper outer surface of the floor tunnel 13 and that extend along the longitudinal direction of the floor tunnel 13. The coupling bracket 18 is attached to the second tunnel reinforcing members 19 via the floor tunnel 13.

According to this configuration, joining the second tunnel reinforcing members 19 along the corner portions on both sides of the upper outer surface extending in the tunnel longitudinal direction of the floor tunnel 13 improves the stiffness of the floor tunnel 13. Joining the coupling bracket 18 to the tunnel interior of the floor tunnel 13 that has improved stiffness and that is provided on the inner sides of the second tunnel reinforcing members 19 can improve the joining strength of the coupling bracket 18. Accordingly, the load inputted into the seat bracket 16*c* can be transmitted from the corner portions of the floor tunnel 13, reinforced by attaching the second tunnel reinforcing members 19 to the outer surfaces, to the coupling bracket 18. Thus, it is possible to suppress vibration of the side wall 13*a* of the floor tunnel 13 and also suppress the vibration of the coupling bracket 18.

(5) The first tunnel reinforcing member 17 includes the upper member 17*a* that is arranged above the intermediate position of the floor tunnel 13 in the height direction in the interior of the floor tunnel 13 and that has a shape forming the closed cross section together with the floor tunnel 13 and the lower member 17*b* that is arranged below the upper member 17*a* and that has a shape tilted upward while extending from the lower portion of the side wall 13*a* of the floor tunnel 13 toward the vehicle width center.

According to this configuration, dividing the first tunnel reinforcing member 17 into the upper member 17*a* and the lower member 17*b* allows load inputted into the upper portion of the floor tunnel 13 and load inputted into the lower portion to be separately supported. In further detail, since the left and right cross members 15*a* and 15*b* in the vehicle width direction are joined to both sides of the floor tunnel 13, load inputted from one cross member 15*a* can be transmitted to the other cross member 15*b* via the upper member 17*a*. The lower member 17*b* can support the floor tunnel 13 and suppress collapse thereof in this transmission.

This is due to the following reason. The lower member 17*b* has the shape tilted upward while extending from the lower portion of the side wall 13*a* of the floor tunnel 13 on the external side toward the vehicle width center of the floor tunnel 13, in other words, the shape tilted downward while extending from the vehicle width center of the floor tunnel 13 toward the lower portion of one side wall 13*a* of the floor tunnel 13 on the external side. Accordingly, the lower member 17*b* can support load transmitted from the other side wall such that the floor tunnel 13 does not collapse. Since the stiffness of the floor tunnel 13 can be improved as described above, vibration inputted from the exhaust pipe (not shown) can be suppressed.

(6) The lower member 17*b* includes the paired truss portions 17*t*1 and 17*t*2 that have the truss shapes obliquely coupling the upper member 17*a* and the side walls of the floor tunnel 13 on both sides in the vehicle width direction to one another in the interior of the floor tunnel 13 and the coupling portion 17*c* that couples the paired truss portions 17*t*1 and 17*t*2 to each other. The coupling portion 17*c* is arranged along the lower surface of the upper member 17*a*.

According to this configuration, connecting the truss portions 17*t*1 and 17*t*2 on both sides of the tunnel interior by the coupling portion 17*c* allows load inputted from the lower portion of the side wall 13*a* of the floor tunnel 13 to be transmitted from one truss portion 17*t*1 to the other truss portion 17*t*2 via the coupling portion 17*c* as shown by the arrows Y1 and Y2 in FIG. 4. Accordingly, it is possible to improve the stiffness of the floor tunnel 13 and suppress vibration and deformation such as collapse of the floor tunnel 13.

(7) The truss portions 17*t*1 and 17*t*2 include the first joining portions t1*a* and t1*b* joined to the lower surface of the floor panel 11 and the second joining portions t1*b* joined to the side walls 13*a* of the floor tunnel 13.

According to this configuration, joining the truss portions 17*t*1 and 17*t*2 of the lower member 17*b* to the floor panel 11 and the side walls 13*a* of the floor tunnel 13 allows load transmitted to the floor tunnel 13 to be transmitted to the first tunnel reinforcing member 17. Thus, it is possible to improve the stiffness of the floor tunnel 13 and suppress vibration and deformation of the floor tunnel 13.

(8) The coupling bracket 18 includes the partition portion 18*a* that is joined to the side walls 13*a* and the top portion 13*b* of the floor tunnel 13 and that partitions the tunnel interior of the floor tunnel 13.

According to this configuration, since the coupling bracket 18 includes the partition portion 18*a* that is joined to the side walls 13*a* and the top portion 13*b* of the floor tunnel 13 and that partitions the interior of the floor tunnel 13, the stiffness of the floor tunnel 13 can be improved. Accordingly, the load inputted into the floor tunnel 13 can be strongly supported. Thus, vibration and deformation of the floor tunnel 13 can be suppressed.

Although the vehicle body structure according to the present embodiment has been described above, the present invention is not limited to this vehicle body structure, and changes can be made as appropriate within a scope not departing from the gist of the present invention.

What is claimed is:

1. A tunnel reinforcing structure comprising:

a floor tunnel that extends in a front-rear direction and that is opened toward a lower external side of a vehicle;

an exhaust pipe that is arranged in an interior of the floor tunnel;

a side sill that extends in the front-rear direction on an outer side in a vehicle width direction of the vehicle;

a floor panel that is provided between the floor tunnel and the side sill;

a floor cross member that extends on the floor panel in the vehicle width direction and that couples the floor tunnel and the side sill to each other;

seat brackets that are arranged in front of and behind the floor cross member and that are joined to the floor tunnel;

a first tunnel reinforcing member that is provided in the interior of the floor tunnel parallel to the floor cross member in the vehicle width direction;

a floor frame that extends in the front-rear direction on the lower external side of the floor panel; and a coupling bracket that is arranged across the interior of the floor tunnel in the vehicle width direction and to which the exhaust pipe is coupled, wherein the seat brackets are attached to the floor frame via the floor panel, and are attached to the coupling bracket via the floor tunnel, the first tunnel reinforcing member includes an upper member that is arranged above an intermediate position of the floor tunnel in a height direction in the interior of the floor tunnel and that has a shape forming a closed cross section together with the floor tunnel, and a lower member that is arranged below the upper member and that has a shape tilted upward while extending from a lower portion of a side wall of the floor tunnel toward a center in the vehicle width direction, the lower member includes paired truss portions that have truss shapes obliquely coupling the upper member and side walls of the floor tunnel on both sides in the vehicle width direction to one another in the interior of the floor tunnel and a coupling portion that couples the paired truss portions to each other, and the coupling portion is arranged along a lower surface of the upper member.

2. The tunnel reinforcing structure according to claim 1, wherein the seat brackets each include a main body portion that forms a hollow cross section with the floor panel being a bottom surface and a seat bracket coupling portion that is coupled to the floor cross member, and the seat bracket coupling portion is formed to extend such that a joining flange extending from a lower end of the main body portion along the floor panel is connected to the floor cross member.

3. The tunnel reinforcing structure according to claim 2, wherein the floor frame extends to intersect the floor cross member, and is welded to the floor cross member via the floor panel in an intersecting portion.

4. The tunnel reinforcing structure according to claim 1, further comprising a second tunnel reinforcing member that is attached to a corner portion of an upper outer surface of the floor tunnel and that extends along a longitudinal direction of the floor tunnel, wherein the coupling bracket is attached to the second tunnel reinforcing member via the floor tunnel.

5. The tunnel reinforcing structure according to claim 1, wherein the truss portions each include a first joining portion joined to a lower surface of the floor panel, and a second joining portion joined to the side wall of the floor tunnel.

6. A tunnel reinforcing structure comprising:

a floor tunnel that extends in a front-rear direction and that is opened toward the lower external side of a vehicle;

an exhaust pipe that is arranged in an interior of the floor tunnel;

a side sill that extends in the front-rear direction on an outer side in a vehicle width direction of the vehicle;

a floor panel that is provided between the floor tunnel and the side sill;

a floor cross member that extends on the floor panel in the vehicle width direction and that couples the floor tunnel and the side sill to each other;

seat brackets that are arranged in front of and behind the floor cross member and that are joined to the floor tunnel;

a first tunnel reinforcing member that is provided in the interior of the floor tunnel parallel to the floor cross member in the vehicle width direction;

a floor frame that extends in the front-rear direction on the lower external side of the floor panel; and a coupling bracket that is arranged across the interior of the floor tunnel in the vehicle width direction and to which the exhaust pipe is coupled, wherein the seat brackets are attached to the floor frame via the floor panel, and are attached to the coupling bracket via the floor tunnel, and the coupling bracket includes a partition portion that is joined to side walls and a top portion of the floor tunnel and that partitions the interior of the floor tunnel.

\* \* \* \* \*